United States Patent [19]

Deguchi

[11] 3,889,894

[45] June 17, 1975

[54] CASSETTE REEL HUB FOR A TAPE RECORDER

[75] Inventor: Michiyuki Deguchi, Tokyo, Japan

[73] Assignee: Ugen-Kaisha Overu Engineering, Tokyo, Japan

[22] Filed: Feb. 5, 1974

[21] Appl. No.: 439,767

[30] Foreign Application Priority Data

Feb. 7, 1973 Japan .............................. 48-16356

[52] U.S. Cl. .................................................. 242/74

[51] Int. Cl. ............................................ B65h 75/28

[58] Field of Search.................... 242/74, 125, 125.1

[56] References Cited

UNITED STATES PATENTS

| | | | |
|---|---|---|---|
| 1,942,186 | 1/1934 | Ross | 242/74 |
| 2,032,214 | 2/1936 | Howell | 242/74 |
| 2,719,679 | 10/1955 | Nerwin | 242/74 |
| 2,904,280 | 9/1959 | Eckels | 242/74 |
| 3,648,944 | 3/1972 | Fujiwara | 242/74 |

FOREIGN PATENTS OR APPLICATIONS

| | | | |
|---|---|---|---|
| 562,159 | 5/1957 | Italy | 242/74 |

*Primary Examiner*—Edward J. McCarthy
*Attorney, Agent, or Firm*—Cushman, Darby & Cushman

[57] ABSTRACT

A reel hub comprises a reel hub body having a center hole provided with a plurality of projections and an outer periphery on which a tape is wound. An opening is provided in the reel hub body in the neighborhood of the outer periphery of the reel hub body and a slit at least sufficient for the tape to be inserted is provided in the outer periphery of the reel hub body to communicate with the opening. An engaging member is provided within the opening to permit it to be fitted into a recess defined in the opening.

7 Claims, 6 Drawing Figures

CASSETTE REEL HUB FOR A TAPE RECORDER

BACKGROUND OF THE INVENTION

This invention relates to a cassette reel hub as used in a cassette tape recorder.

With a conventional cassette reel hub a recess is provided in the outer periphery of the reel hub body and a tape is sandwiched between the inner wall surface of the recess and an engaging member fitted into the recess. It is necessary, however, that the engaging member be accurately formed to correspond to the associated recess. Furthermore, a bulgy portion is created at that portion of the outer periphery of the reel hub at which the engaging member is fitted into the recess. As a result, a tape is wound on the outer periphery of the reel hub with the bulgy portion left as it is, with the resultant disadvantage. A careful operation is also necessary to fit the engaging member into the recess so that no bulgy portion is left on the outer periphery of the reel hub. In this case, a certain amount of skill is necessary and a manual operation is also required. This presents a bar to mass production.

SUMMARY OF THE INVENTION

It is accordingly the object of this invention to provide a cassette reel hub capable of easily effecting a tape attaching operation without leaving any bulgy portion on the outer periphery of the reel hub.

According to this invention a slit at least sufficient for a tape to be inserted is provided in the outer periphery of the reel hub and an opening is provided below the slit and in the neighborhood of the outer periphery of the reel hub to communicate with the slit. An engaging member and a recess for receipt of the engaging member are provided within the opening. After insertion of the tape through the slit into the opening the engaging member is fitted into the recess to cause the tape to be sandwiched between the inner surface of the recess and the engaging member. Consequently, the tape is securely attached to the reel hub.

DETAILED DESCRIPTION OF THE INVENTION

Figure 1:
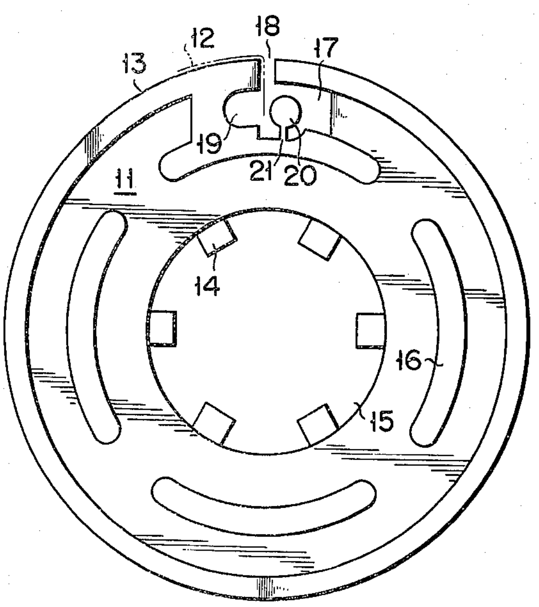
FIG. 1 is a plan view of a cassette reel hub according to one embodiment of this invention.

In FIG. 1 a reel hub 11 has an outer periphery 13 on which a tape 12 is wound, a center hole 15 having an inner peripheral wall provided with a plurality of projections 14, and a plurality of arcuate projections 16 for reinforcing the reel hub. An opening 17 is provided in the reel hub in the neighborhood of the outer periphery 13 of the reel hub. The opening 17 communicates with a slit 18 having a space at least sufficient for the tape to be inserted. One end of the opening 17 defines a substantially semi-circular recess 19. At substantially the center of the opening 17 a ball-like engaging member 20 is connected through a narrower connecting portion 21 to the wall of the opening. The ball-like engaging member 20 has a size fittingly insertible into the semi-circular recess 19. The reel hub 12 so constructed is usually one piece molded from synthetic resin.

Figure 2:
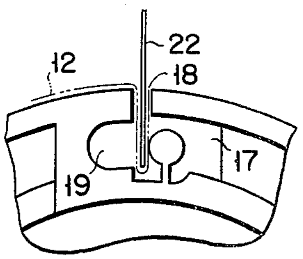
FIGS. 2 to 4 show a process for attaching a tape to the reel hub.
Figure 3:
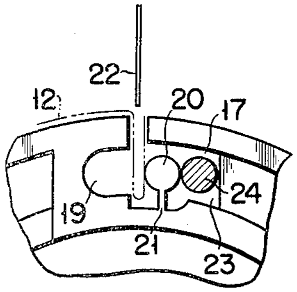
Figure 4:
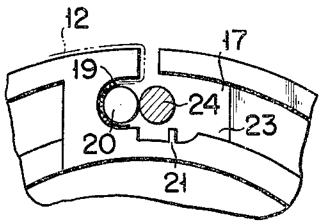

When one end of the tape 12 is attached to the reel hub 11, one end of the tape is inserted through the slit 18 into the opening 17, as shown in FIG. 2, using a thin plate 22. After withdrawal of the thin plate 22 a taper rod 24 is inserted into a space in the opening opposite to the semi-circular recess 19 as shown in FIG. 3 to cause the narrower connecting portion 21 to be fractured to permit the ball-like engaging member 20 to be fitted into the same-circular recess as shown in FIG. 4. At this time the tape end is sandwiched between the ball-like engaging member 20 and the inner wall of the recess 19 to cause the tape to be securely attached to the reel hub 11.

Since the slit provided in the outer periphery of the reel hub has only a minimal space necessary for the tape to be inserted, a tape can be smoothly wound on the outer periphery of the reel hub. As the end portion of the tape is fixedly secured between the inner wall of the recess and the engaging member 20 in a manner to be bent at substantially right angle, no tension force tending to cause the tape to be disengaged from the reel hub is applied and no unauthorized disengagement of the tape from the reel hub takes place.

Attachment of the tape to the reel hub can be automatically effected on a large scale using a suitable mechanical device.

Though with the above-mentioned embodiment the engaging member 20 is ball-like in shape, it may be, for example, semi-spherical, elliptical or bullet-like in shape. It is preferred that the recess 19 be formed to correspond to the size of the engaging member 20.

Figure 5:
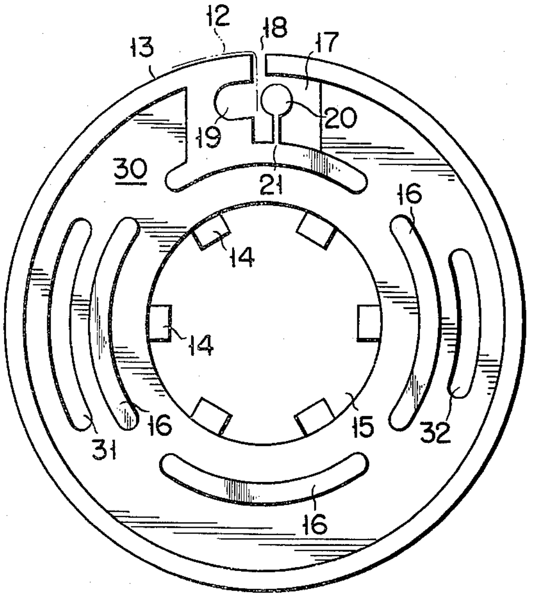
FIG. 5 is a plan view of a cassette reel hub according to another embodiment of this invention.

FIG. 5 shows another embodiment in which the same reference numeral is used to indicate the similar part. A reel hub 30 has two holes 31 and 32 different in size. Plural reel hubs 30 can be easily arranged side by side through the holes 31 and 32 with their slits 18 positioned all in alignment, and thus the operation of inserting the tape into the slit can be easily effected. It is also possible to attach respective tapes to respective reel hubs.

A suction air pressure is introduced into the holes 31 and 32 in arranging the slits 18 of the reel hubs 30 all in alignment. If the slits of the reel hubs are not aligned, an air pressure difference is produced. When the reel hubs are arranged so that the air pressure difference is eliminated between the respective reel hubs, then all the reel hubs are aligned with ease. In more particular, when the slits of the reel hubs are not aligned the reel hub whose slit is out of alignment with the remaining reel hub is suctioned by a suction air difference and so detected. In this case, all the slits of the reel hubs can be readily arranged in alignment by adjustably rotating the reel hub whose slit is out of alignment.

Figure 6:
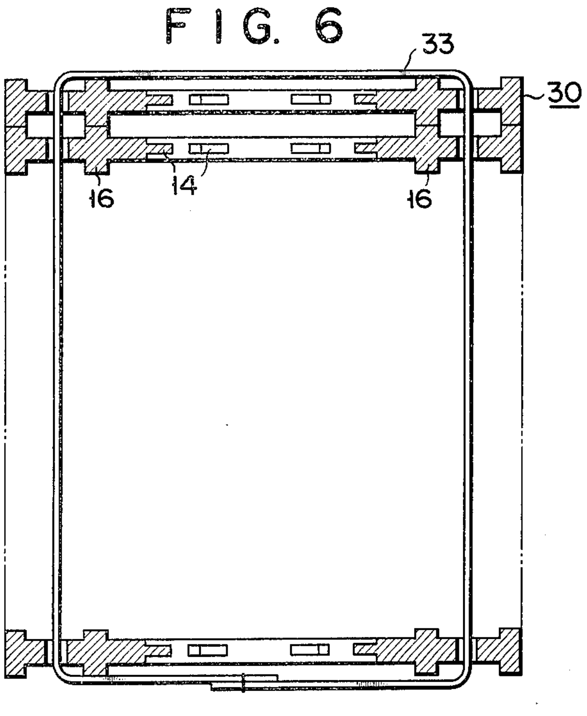
FIG. 6 is a cross sectional view of plural reel hubs of FIG. 5 held into a bundle.

The reel hubs so aligned are held together, as shown in FIG. 6, in a unit of tens by a packing band 33 made of, for example, a cardboard. In this case, the reel hubs can be stored in a compact form without involving any damage. The reel hubs so held together can be automatically withdrawn with ease.

The reel hub so constructed is wound with a tape and is inserted into a cassette housing. A cassette having such reel hub can be used in a cassette type tape recorder and cassette type 8 mm motion picture film.

What is claimed is:

1. A reel hub for a cassette comprising a reel hub body having an outer periphery on which a tape is wound, an opening provided adjacent to the outer periphery and having an inner surface, a slit provided in the outer periphery of the reel hub body to communicate with the opening and adapted to permit the tape to be inserted therethrough, and a recess communicating with the opening; and engaging member provided in the opening, and a connecting member for connecting the engaging member to the inner surface of the opening, the connecting member being fractured to fit the engaging member into the recess thereby to fixedly secure the end of the tape between the inner surface of the recess and the engaging member.

2. The reel hub according to claim 1 in which the recess is of a semi-circular shape and the engaging member is ball-like in shape.

3. The reel hub according to claim 2 in which the ball-like engaging member has a size fittingly insertible into the semi-circular recess.

4. The reel hub according to claim 1 in which all of the reel hub body, the engaging member and the connecting member is one piece molded from synthetic resin.

5. The reel hub according to claim 1 in which said reel hub body has at least two holes different in size.

6. The reel hub according to claim 1 in which said reel hub body has a plurality of projections for reinforcing the reel hub.

7. The reel hub according to claim 1 in which said reel hub body has a center hole whose peripheral wall has a plurality of projections.

* * * * *